(12) United States Patent
Van Schijndel et al.

(10) Patent No.: US 7,098,293 B2
(45) Date of Patent: Aug. 29, 2006

(54) POLYESTERAMIDE COPOLYMER

(75) Inventors: Renee Josie Gide Van Schijndel, Gouda (NL); Jeffrey Thomas Carter, Marton (GB); Eric Appleman, Dordrecht (NL)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 10/477,558

(22) PCT Filed: May 2, 2002

(86) PCT No.: PCT/GB02/02032

§ 371 (c)(1),
(2), (4) Date: Apr. 14, 2004

(87) PCT Pub. No.: WO02/092662

PCT Pub. Date: Nov. 21, 2002

(65) Prior Publication Data

US 2004/0158027 A1    Aug. 12, 2004

(30) Foreign Application Priority Data

May 15, 2001  (GB) ................. 0111794.4

(51) Int. Cl.
*C08G 69/44* (2006.01)

(52) U.S. Cl. ............. 528/272; 528/288; 156/60; 428/327

(58) Field of Classification Search ............. 156/60; 428/327; 524/602; 528/272, 288
See application file for complete search history.

(56) References Cited

U.S. PATENT DOCUMENTS

| | | | |
|---|---|---|---|
| 4,150,002 A | | 4/1979 | Drawert et al. |
| 4,343,743 A | * | 8/1982 | Coquard et al. ............ 564/123 |
| 4,409,373 A | | 10/1983 | Wiemers et al. |
| 4,548,996 A | * | 10/1985 | Donermeyer et al. .... 525/420.5 |
| 4,673,727 A | * | 6/1987 | Miller, Jr. ................ 528/295.5 |
| 4,777,238 A | | 10/1988 | Leoni et al. |
| 4,791,164 A | | 12/1988 | Wichelhaus et al. |

FOREIGN PATENT DOCUMENTS

| | | |
|---|---|---|
| EP | 0030904 A1 | 6/1981 |
| EP | 0204315 A2 | 12/1986 |
| EP | 0608976 | 8/1994 |
| JP | 59213724 | 3/1984 |
| JP | 2002000601 | 1/2002 |
| JP | 2002001844 | 1/2002 |
| JP | 2002003601 | 1/2002 |
| JP | 2002012844 | 1/2002 |

OTHER PUBLICATIONS

Niesten et al., "Thermoplastic Elastomers from Segmented Copolyetheresteramides with Self Assembling Aramid Units," *Amer. Chem. Soc. Div. Polym. Chem.*, 40(2), 1999, pp. 1012-1013.
Van Hutten et al., "Segmented Copolymers with Polyesteramide Units of Uniform Length: Structure Analysis," *Polymer*, 34(20), 1993, pp. 4193-4202.
Bera et al., "Block/Segmented Polymers. A New Method of Synthesis of Copoly (amide-Ester)—Ester Polymer," *Journal of Polymer Science: Part A: Polymer Chemistry*, vol. 31, 1993, pp. 731-739.
Fakirov et al., "Multiblock Poly-(Ether-Ester-Amide)s Based on Polyamide-6 and Poly(Ethylene Glycol), 1," "Effect of Polyether Segment Length on the Properties of Poly(Ether-Ester-Amide)s with Various Polyamide/Polyether Ratios," *Macromol. Chem.*, vol. 193, 1993, pp. 2391-2404.

* cited by examiner

*Primary Examiner*—Rachel Gorr
(74) *Attorney, Agent, or Firm*—Mayer, Brown, Rowe & Maw LLP

(57) ABSTRACT

A polyesteramide copolymer having a glass transition temperature (Tg) of less than or equal to 0° C., contains at least one hard segment containing at least one amide bond, and at least one soft segment containing at least one ester bond. The soft segment is formed from at least one dimer fatty acid and/or dimer fatty diol and/or equivalent thereof. The copolymer is particularly suitable for use as a hot melt adhesive on low energy surfaces.

21 Claims, No Drawings

POLYESTERAMIDE COPOLYMER

CROSS REFERENCE TO RELATED APPLICATION

This application is the National Phase application of International Application No. PCT/GB02/02032, filed May 2, 2002, which designates the United States. This application, in its entirety, is incorporated herein by reference.

FIELD OF INVENTION

The present invention relates to a polyesteramide copolymer, and in particular to the use thereof as an adhesive.

BACKGROUND

Hot-melt adhesives, e.g. polyamides, polyesters and copolymers thereof, can be used in a wide range of applications. The polar amide or ester groups provide excellent cohesive strength and adhesion to polar substrates like paper, wood and metal. Also partly because of the presence of the polar groups, the materials are solids which are easy to handle at room temperature, and melt at a well-defined temperature range to produce an easily applied fluid which solidifies quickly to produce the adhesive bond. An obvious benefit is the absence of any solvent, which makes hot melt adhesives a technology of increasing importance.

Unfortunately, known polyamide hot melt adhesives interact poorly with low-energy substrates such as polyolefins, resulting in poor adhesive strength. In addition, low-energy substrates tend to be flexible (e.g. polyolefin films) and are used under a wide variety of conditions, such as over a wide temperature range. This requires suitable adhesives to have good flexibility, for example at temperatures as low as −60° C., and an ability to absorb differences in thermal expansion of substrates. Known polyamide hot-melt adhesives tend to have insufficient flexibility.

It is this combination of low-temperature flexibility, and adhesion to low energy substrates, whilst maintaining cohesive strength that has been difficult to achieve with polyamide hot melt adhesives.

REVIEW OF PRIOR ART

Polyamide hot-melt adhesives have been modified in a variety of ways to improve the properties thereof.

U.S. Pat. No. 4,409,373 discloses a polyamide adhesive containing polyether groups in order to obtain low temperature flexibility. However, adhesion to low energy substrates is not very effective.

U.S. Pat. No. 4,777,238 describes a polyamide hot-melt adhesive which contains secondary diamines, and is said to improve substrate adhesion. Aluminium, PVC and polyester are bonded together (to themselves) in the examples in the patent, using the polyamide hot-melt adhesive described therein.

U.S. Pat. No. 4,791,164 discloses a hot-melt adhesive which is a mixture of a polyamide and an ethylene copolymer or terpolymer. The hot-melt adhesive is described as being suitable for bonding polyethylene. However, two-component systems are well known to be susceptible to problems such as incompatibility, separation, and migration.

SUMMARY OF THE INVENTION

We have now surprisingly discovered a modified polyamide which can be used as a hot-melt adhesive, which reduces or substantially overcomes at least one of the aforementioned problems.

Accordingly, the present invention provides a polyesteramide copolymer having a glass transition temperature (Tg) of less than or equal to 0° C., which comprises at least one hard segment comprising at least one amide bond, and at least one soft segment comprising at least one ester bond which is formed from at least one dimer fatty acid and/or dimer fatty diol and/or equivalent thereof.

The invention also provides an article comprising a substrate layer having a surface energy of less than 50 mN/m, and having on at least one surface thereof an adhesive layer comprising a polyesteramide copolymer having a glass transition temperature (Tg) of less than or equal to 0° C., which comprises at least one hard segment comprising at least one amide bond, and at least one soft segment comprising at least one ester bond which is formed from at least one dimer fatty acid and/or dimer fatty diol and/or equivalent thereof.

The invention further provides a method of forming a polyesteramide copolymer having a glass transition temperature (Tg) of less than or equal to 0° C., which comprises at least one hard segment comprising at least one amide bond, and at least one soft segment comprising at least one ester bond which is formed from at least one dimer fatty acid and/or dimer fatty diol and/or equivalent thereof, which comprises (i) pre-forming the hard segment, and (ii) forming the soft segment in situ in the presence of the hard segment.

The invention still further provides the use of a polyesteramide copolymer having a glass transition temperature (Tg) of less than or equal to 0° C., which comprises at least one hard segment comprising at least one amide bond, and at least one soft segment comprising at least one ester bond which is formed from at least one dimer fatty acid and/or dimer fatty diol and/or equivalent thereof, as an adhesive.

The hard segment of the copolymer according to the present invention comprises at least one, preferably in the range from 2 to 35, more preferably 3 to 20, particularly 4 to 15, and especially 5 to 10 amide bonds. Thus, the hard segment is preferably an oligoamide or polyamide (hereinafter referred to as polyamide).

The composition of the hard segment may vary over a wide range. Polyamide is normally produced in a condensation reaction between a dicarboxylic acid and a diamine. There are two major classes of dicarboxylic acids which can be used to form polyamides, namely dimeric fatty dicarboxylic acids and non-dimeric fatty dicarboxylic acids.

The term dimer fatty acid is well known in the art and refers to the dimerisation product of mono-or polyunsaturated fatty acids and/or esters thereof. Preferred dimer acids are dimers of $C_{10}$ to $C_{30}$, more preferably $C_{12}$ to $C_{24}$, particularly $C_{14}$ to $C_{22}$, and especially $C_{18}$ alkyl chains. Suitable dimer fatty acids include the dimerisation products of oleic acid, linoleic acid, linolenic acid, palmitoleic acid, and elaidic acid. The dimerisation products of the unsaturated fatty acid mixtures obtained in the hydrolysis of natural fats and oils, e.g. sunflower oil, soybean oil, olive oil, rapeseed oil, cottonseed oil and tall oil, may also be used. Hydrogenated, for example by using a nickel catalyst, dimer fatty acids may also be employed.

In addition to the dimer fatty acids, dimerisation usually results in varying amounts of oligomeric fatty acids (so-called "trimer") and residues of monomeric fatty acids (so-called "monomer"), or esters thereof, being present. The amount of monomer can, for example, be reduced by distillation. Particularly preferred dimer fatty acids have a dicarboxylic (or dimer) content of greater than 70%, more preferably greater than 85%, and particularly greater than 94% by weight.

Suitable non-dimeric fatty dicarboxylic acids (hereinafter referred to as non-dimeric fatty acids) may be aliphatic or aromatic, and include dicarboxylic acids and the esters, preferably alkyl esters, thereof, preferably linear dicarboxylic acids having terminal carboxyl groups having a carbon chain of from 2 to 20, more preferably 6 to 12 carbon atoms, such as adipic acid, pimelic acid, suberic acid, azelaic acid, sebacic acid, heptane dicarboxylic acid, octane dicarboxylic acid, nonane dicarcoxylic acid, decane dicarboxylic acid, undecane dicarboxylic acid, dodecane dicarboxylic acid and higher homologs thereof.

The polyamide hard segment is preferably formed from dimer fatty acids to non-dimer fatty acids present at a ratio of from 0 to 100%:0 to 100%, more preferably 50 to 100%:0 to 50%, and particularly 80 to 100%:0 to 20% by weight of the total dicarboxylic acids.

Suitable diamines include amine-equivalents of the aforementioned dicarboxylic acids, but generally shorter chain materials are preferred, particularly those containing from 2 to 7 carbon atoms. Diamines such as ethylenediamine, propylenediamine, tetramethylenediamine, pentamethylenediamine, hexamethylenediamine, as well as dimer fatty diamines (derived from dimer fatty acids) are preferred. Suitable aromatic diamines include materials derived from benzene, toluene and other substituted aromatic materials, such as 2,6-tolylenediamine, 4,4-diphenylmethanediamine and xylylenediamine. Other suitable diamines include those which contain one or two secondary amino groups, and heterocyclic diamines, for example piperazine. Branched diamines, such as 3-methyl pentane diamine may also be used.

The ratio of dicarboxylic acid to diamine starting materials used to form the polyamide segment is preferably in the range from 1.0 to 5.0:1, more preferably 1.05 to 3.0:1, particularly 1.1 to 2.0:1, and especially 1.2 to 1.4:1. The polyamide is preferably carboxy terminated at both ends, particularly by dimer fatty acids as described herein.

The hard segment is suitably a block, preferably having a molecular weight number average in the range from 500 to 15,000, more preferably 1,000 to 10,000, particularly 1,500 to 6,000, and especially 2,000 to 4,000.

The hard segment preferably has a softening point in the range from 60 to 200° C., more preferably 65 to 150° C., particularly 70 to 125° C., and especially 75 to 100° C.

The hard segment preferably has an acid value (measured as described herein) in the range of from 10 to 200, more preferably 20 to 100, particularly 25 to 50, and especially 30 to 40 mgKOH/g. In addition, the hard segment preferably has an amine value (measured as described herein) of less than 10, more preferably less than 5, particularly less than 3, and especially less than 1 mgKOH/g.

The soft segment of the copolymer according to the present invention comprises at least one, preferably in the range from 1 to 20, more preferably 2 to 15, particularly 2 to 10, and especially 3 to 5 ester bonds. Thus, the soft segment is preferably an oligoester or polyester (hereinafter referred to as polyester).

Polyester is normally produced in a condensation reaction between a dicarboxylic acid and a diol. Suitable dicarboxylic acids include any of those mentioned above for use in forming the hard segment. Suitable diols include straight chain aliphatic diols such as ethylene glycol, 1,3-propylene glycol 1,4-butyleneglycol, 1,6-hexylene glycol, branched diols such as neopentyl glycol, 3-methyl pentane glycol, 1,2-propylene glycol, and cyclic diols such as 1,4-bis (hydroxymethyl)cyclohexane and (1,4-cyclohexane-dimethanol). Preferred diols are straight chain aliphatic diols containing up to 6 carbon atoms, particularly 1,6-hexylene glycol.

The polyester soft segment is formed from a dimer fatty acid and/or ester derivative thereof and/or dimer fatty diol. Dimer fatty acids are mentioned above in relation to the hard segment, and dimer fatty diols can be produced by hydrogenation of the corresponding dimer acid. The same preferences above for the dimer fatty acid component of the hard segment apply to the dimer fatty acid and/or corresponding dimer fatty diol component of the soft segment. In a preferred embodiment, the soft segment is formed from dimer fatty acid and at least one straight chain aliphatic diol containing up to 6 carbon atoms, particularly 1,6-hexylene glycol.

The soft segment of the copolymer preferably has a glass transiion temperature (Tg) in the range from −60 to 0° C., more preferably −50 to −10° C., particularly −40 to −20° C., and especially −35to 25° C.

The soft segment preferably has a hydroxyl value (measured as described herein) and/or an acid value (measured as described herein) in the range from 5 to 220, more preferably 25 to 200, particularly 40 to 190, and especially 55 to 180 mgKOH/g. In a preferred embodiment, the soft segment has a hydroxyl value or an acid value within the aforementioned ranges, with the hydroxyl or acid value which is outside the ranges being preferably less than 1.

The soft segment preferably has a molecular weight number average in the range from 500 to 15,000, more preferably 500 to 8,000, particularly 550 to 3,000, and especially 600 to 2000.

The ratio of hard segment to soft segment present in the copolymer is preferably in the range from 1 to 25:1, more preferably 4 to 20:1, particularly 6 to 15:1, and especially 8 to 10:1 by weight.

The polyesteramide copolymer preferably comprises in the range from 1 to 35, more preferably 2 to 20, particularly 3 to 10, and especially 4 to 6 separate segments of hard segment and soft segment combined, ie added together. The copolymer preferably has a molecular weight number average in the range from 5,000 to 80,000, more preferably 10,000 to 50,000, particularly 13,000 to 30,000, and especially 15,000 to 20,000.

The copolymer preferably comprises less than 15, more preferably less than 10, particularly less than 5, and especially less than 2 weight % of ether or polyether groups. Thus, in a preferred embodiment the copolymer comprises substantially no ether or polyether groups, and more preferably consists essentially of polyamide hard segments and polyester soft segments as defined herein.

The copolymer preferably has a softening point in the range from 60 to 200° C., more preferably 65 to 150° C., particularly 70 to 125° C., and especially 75 to 100° C.

The copolymer preferably has a glass transition temperature (Tg) in the range from −60 to 0° C., more preferably −50 to −10° C., particularly 40 to −20° C., and especially −35 to −25 ° C.

The copolymer preferably has an acid value in the range from 1.5 to 25, more preferably 3 to 15, particularly 4.5 to 10, and especially 5.5 to 7.5 mgKOH/g. In addition, the copolymer preferably has an amine value of less than 10, more preferably less than 5, particularly less than 3, and especially less than 1 mgKOH/g. The copolymer also preferably has a hydroxyl value of less than 30, more preferably less than 15, particularly less than 5, and especially less than 2 mgKOH/g.

The copolymer according to the present invention may be produced by preforming both the hard segment and soft segment, prior to reacting them together. It is preferred however to preform the hard segment, and to form the soft segment in situ in the presence of the hard segment, for example by the addition of a diol to a polyamide prepolymer containing sufficient residual acid groups.

An alternative route for the preparation of the copolymer comprises preforming the soft segment (oligoester (or polyester)), followed by grafting with an amine, preferably diamine, in order to link the oligoesters together to form a prepolymer with a relatively high acid number. This low conversion degree is chosen to suppress transamidation of the oligoesters. The remaining acid groups can be subsequenuy reacted with an isocyanate, preferably diisocyanate, to produce additional amide bonds without breaking up the oligoester structure. When this method is employed, the copolymer preferably comprises up to 15%, more preferably in the range from 1 to 10%, particularly 2 to 8%, and especially 3 to 7 weight % of urethane.

One particular advantage of the polyesteramide copolymer described herein is improved substrate adhesion, particularly on low energy surfaces, preferably having a surface energy of less than 50, more preferably in the range from 10 to 45, particularly 20 to 40, and especially 25 to 35 mN/m. A preferred substrate is a polyolefin such as plypropylene, preferably polyethylene. Laminate structures may be formed, for example using the copolymer of the present invention to adhere two low surface energy materials together, preferably polyolefin. Alternatively, laminates may be formed by adhering a low surface energy material to a high surface energy material. The physical form of the substrate may vary over a wide range from thin films to 3-dimensional objects such as car bumpers, tubing for electrical connections.

In a particularly preferred embodiment of the invention, the copolymer when applied as an adhesive layer on a polyolefin substrate, preferably polyethylene, has an adhesive strength (measured as described herein) of greater than 0.4, more preferably greater than 0.8, particularly greater than 1, and especially greater than 2 N/mm$^2$.

In addition, the polyesteramide copolymer suitably exhibits improved adhesion to aluminium, preferably having an adhesive fracture energy (measured as described herein) of greater than 10, more preferably greater than 25, particularly greater than 65, and especially greater than 100 Joules/m$^2$.

The polyesteramide copolymer described herein may be used as an adhesive in a wide range of applications such as tubing, in various automotive uses, and in inks, for example printed onto flexible packaging. A particularly preferred application is as an adhesive on shrink wrap tubing, for example for electrical connections.

An alternative use of the copolymer is as a thermoplastic elastomer used for engineering purposes, which exhibits both improved elastic and high temperature properties. In such an application, the polyamide hard segment is for example polycaprolactam (nylon-6), the polyamide of adipic acid and hexane diamine (nylon 6,6), polylauryllactam (nylon 12), or the polymer of 1-amino-undecanoic acid (nylon-11).

The invention is illustrated by the following non-limiting examples.

In this specification the following test methods have been used.
(i) The softening point and glass transition temperature (Tg) were measured by Differential Scanning Calorimetry (DSC) at a scan rate of 20° C./minute using a Mettler DSC30.
(ii) Molecular weight number average was determined by end group analysis using NMR.
(iii) The hydroxyl value is defined as the number of mg of potassium hydroxide equivalent to the hydroxyl content of 1 g of sample, and was measured by acetylation followed by hydrolysation of excess acetic anhyride. The acetic acide formed was subsequently titrated with an ethanolic potassium hydroxide solution.
(iv) The acid value is defined as the number of mg of potassium hydroxide required to neutralise the free fatty acids in 1 g of sample, and was measured by direct titration with a standard potassium hydroxide solution.
(v) The amine value is defined as the number of mg of potassium hydroxide per 1 g of sample, and was measured by direct titration with a standard potassium hydroxide solution, followed by titration with hydrochloric acid using bromophenol blue as an indicator.
(vi) Substrate adhesion;
(a) to polyolefin was measured by using a lap shear bond test according to ASTM D1002 using an Instron tensile tester. Two pieces of low density polyethylene of thickness 4 mm were glued together by melting 25 mm×25 mm of the copolymer adhesive onto the first piece of polyethylene, followed by application of the second piece of polyethylene. The adhesive was allowed to set at room temperature under light pressure. The sample was conditioned at 50% RV and 23° C. foir at least 24 hours prior to testing. The load at which the adhesive bond failed is the adhesive strength of the polyamide copolymer to polyethylene; and
(b) to aluminium was measured in a fixed arm peel test. An adhesive layer of the copolymer was applied to an aluminium plate under vacuum, to remove trapped air and volatiles. A fully cleaned and degreased strip of aluminium foil was then applied to the molten adhesive using a hydraulic press in order to closely control the final adhesive layer thickness. The test sample was then allowed to cool and equilibrate at 50% RV and 23° C. for at least 24 hours prior to testing. The peel test itself involves peeling the aluminium foil strip from the adhesive at an approximate 45° angle, and measuring the applied force (adhesive fracture energy ($G_a$)).

EXAMPLES

Example 1

900 g of "Pripol" 1013 ((trade mark) dimer acid, C36 dicarboxylic (ex Uniqema)) was placed into a round bottomed flask fitted with a mechanical stirrer, condenser (to remove evolved water), nitrogen inlet, dropping funnel and vacuum take off. The dimer acid was heated to about 80° C., and 76.5 g of ethylene diamine was added to the reaction dropwise. Care was taken to minimise any possible exothermic reaction. After complete addition of the diamine, the reaction was held at 80° C. for 1 hour. The reaction temperature was raised to 160° C. and held for 1 hour. The temperature was further increased to 200° C. and held for another 1 hour. The resulting polyamide prepolymer had the following properties, measured as described above;

(i) The molecular weight number average was 2300.
(ii) The acid value was 37 mgKOH/g.
(iii) The amine value was 0.2 mgKOH/g.

14.5 g of 1,6-hexylene glycol was added dropwise to 370 g of the polyamide prepolymer produced above, and reacted for 4 hours at 225° C. For the final 45 minutes reaction time, a vacuum was applied at a value of 30 mbar to remove water. The resulting polyesteramide copolymer had the following properties, measured as described above;
(i) The softening point was 98° C., and the glass transition temperature (Tg) was −39° C.
(ii) The molecular weight number average was 5900.
(iii) The hydroxyl value was 6 mgKOH/g.
(iv) The acid value was 9 mgKOH/g.
(v) The amine value was 4 mgKOH/g.
(vi) Substrate adhesion to polyolefin was 0.34 N/mm². Failure was adhesive failure, ie at the adhesive/substrate interface.

Example 2

400 g of "Pripol" 1013 was placed into a round bottomed flask as in Example 1. The dimer acid was heated to about 225° C., and 16.4 g of 1,6-hexylene glycol was added to the reaction dropwise. After complete addition of the diol, the reaction was held at 225° C. for 1 hour. The resulting oligoester prepolymer had the following properties, measured as described above;
(i) The molecular weight number average was about 750.
(ii) The acid value was 153 mgKOH/g.
(iii) The hydroxyl value was 0 mgKOH/g.

25.5 g of ethylene diamine was added dropwise to 410 g of the oligoester prepolymer produced above, and reacted for 1.5 hours at 200° C. The product was dried at full vacuum while cooling to 180° C. 19 g of hexane diisocyanate was added dropwise and reacted for 3 hours at 225° C., with evolution of carbon dioxide. The resulting polyesteramide copolymer had the following properties, measured as described above;
(i) The molecular weight number average was 9,500.
(ii) The hydroxyl value was <1 mgKOH/g.
(iii) The acid value was 10.8 mgKOH/g.
(iv) The amine value was 0.9 mgKOH/g.
(v) Substrate adhesion to polyolefin was 0.7 N/mm². Failure was adhesive failure, ie at the adhesive/substrate interface.

Example 3

238 g "Pripol" 1013 was placed into a round bottomed flask as in Example 1. The dimer acid was heated to 80° C., and 21.1 g ethylene diamine was added to the reaction dropwise. After complete addition, the reaction was held at 80° C. for 1 hour. The reaction temperature was raised to 160° C. and was held for 1 hour. The temperature was further increased to 200° C. and was held for 1 hour. After this time, 66.4 g 1,6-hexylene glycol was added to the reaction mixture. Finally the reaction temperature was increased to 225° C. and held for 4 hours. For the final 45 minutes reaction time, a vacuum was applied at a value of 30 mbar. The resulting polyesteramide copolymer had the following properties, measured as described above:
(i) The softening point was 91° C., and the glass transition temperature (Tg) was −55° C.
(ii) The molecular weight number average was 4,500.
(iii) The hydroxyl value was 7 mgKOH/g.
(iv) The acid value was 17 mgKOH/g.
(v) The amine value was 0.7 mgKOH/g.
(vi) Substrate adhesion to polyolefin was 0.84 N/mm². Failure was adhesive failure, ie at the adhesive/substrate interface.

Example 4

258 g "Pripol" 1013 was placed into a round bottomed flask as in Example 1. The dimer acid was heated to 80° C., and 44.4 g ethylene diamine was added to the reaction dropwise over a period of 30 minutes. After complete addition, the reaction was held at 80° C. for 1 hour. The reaction temperature was raised to 160° C. and was held for 40 minutes. The temperature was further increased to 200° C. and was held for 1 hour. After this time, 24.6 g of "Pripol" 2033 (dimer diol, C36 dicarboxylic (ex Uniqema)) was added to the reaction mixture. Finally the reaction temperature was increased to 225° C. and held for 5 hours. After this time, a vacuum was applied at a value of 30 mbar for 2 hours. The resulting polyesteramide copolymer had the following properties, measured as described above:
(i) The softening point was 95° C., and the glass transition temperature (Tg) was −46° C.
(ii) The molecular weight number average was 12,750.
(iii) The hydroxyl value was 7.5 mgKOH/g.
(iv) The acid value was 17.5 mgKOH/g.
(v) The amine value was 0.1 mgKOH/g.
(vi) Substrate adhesion to aluminium was 28 Joules/m².

Example 5

238 g "Pripol" 1013 was placed into a round bottomed flask as in Example 1. The dimer acid was heated to 80° C., and 21.1 g ethylene diamine was added to the reaction dropwise over a period of 30 minutes. After complete addition, the reaction was held at 80° C. for 1 hour. The reaction temperature was raised to 160° C. and was held for 60 minutes. The temperature was further increased to 200° C. and was held for 1 hour. After this time, 66.4 g of "Priplast" 3198 ((trade mark) (ex Uniqema)) was added to the reaction mixture. Finally the reaction temperature was increased to 225° C. and held for 5 hours. After this time, a vacuum was applied at a value of 30 mbar for 2 hours. The resulting polyesteramide copolymer had the following properties, measured as described above:
(i) The softening point was 91° C., and the glass transition temperature (Tg) was −55° C.
(ii) The molecular weight number average was 12,980.
(iii) The hydroxyl value was 7 mgKOH/g.
(iv) The acid value was 17.1 mgKOH/g.
(v) The amine value was 0.1 mgKOH/g.
(vi) Substrate adhesion to aluminium was 70 Joules/m².

The above examples illustrate the improved properties of a polyesteramide copolymer according to the present invention.

The invention claimed is:

1. A polyesteramide copolymer having a glass transition temperature (Tg) of less than or equal to 0° C., which comprises at least one hard segment comprising at least one amide bond, and wherein acid residues in said hard segment consist essentially of dimer fatty acid residues, and at least one soft segment comprising at least one ester bond which is derived from at least one dimer fatty diol and/or a polyester comprising at least one dimer fatty acid and/or dimer fatty diol and/or equivalent thereof.

2. A copolymer according to claim 1 wherein the copolymer has a Tg of less than or equal to −10° C.

3. A copolymer according to claim 1 wherein the copolymer has a softening point in the range from 60 to 200° C.

4. A copolymer according to claim 1 wherein the copolymer has a molecular weight number average in the range from 10,000 to 50,000.

5. A copolymer according to claim 1 wherein the copolymer comprises in the range from 3 to 10 separate segments of hard segment and soft segment combined.

6. A copolymer according to claim 1 wherein the copolymer has a softening point in the range from 65 to 125° C.

7. A copolymer according to claim 1 wherein the soft segment has a molecular weight number average in the range from 550 to 3,000.

8. A copolymer according to claim 1 wherein the copolymer has an adhesive strength to low density polyethylene of greater than 0.4 N/mm$^2$.

9. An article comprising a substrate layer having a surface energy of less than 50 mN/m, and having on at least one surface thereof an adhesive layer comprising a polyesteramide copolymer having a glass transition temperature (Tg) of less than or equal to 0° C.; which comprises at least one hard segment comprising at least one amide bond, and wherein acid residues in said hard segment consist essentially of diner fatty acid residues, and at least one soft segment comprising at least one ester bond which is derived from at least one dimer fatty diol and/or a polyester comprising at least one diner fatty acid and/or dimer fatty diol and/or equivalent thereof.

10. An article according to claim 9 wherein the substrate is a polyolefin.

11. A method of forming a polyesteramide copolymer having a glass transition temperature (Tg) of less than or equal to 0° C.; which comprises at least one hard segment comprising at least one amide bond, and wherein acid residues in said hard segment consist essentially of dimer fatty acid residues, and at least one soft segment comprising at least one ester bond which is formed from at least one dimer fatty acid and/or dimer fatty diol and/or equivalent thereof, which comprises (i) pre-forming the hard segment, and (ii) forming the soft segment in situ from at least one dimer fatty diol in the presence of the hard segment.

12. An adhesive comprising a polyesteramide copolymer having a glass transition temperature (Tg) of less than or equal to 0° C.; which comprises at least one hard segment comprising at least one amide bond, and wherein acid residues in said hard segment consist essentially of dimer fatty acid residues and at least one soft segment comprising at least one ester bond which is derived from at least one dimer fatty diol and/or a polyester comprising at least one dimer fatty acid and/or dimer fatty diol and/or equivalent thereof.

13. A copolymer according to claim 1 wherein the copolymer has a softening point of not more than 125° C.

14. A copolymer according to claim 1 wherein the copolymer has a softening point in the range from 60 to 125° C.

15. A copolymer according to claim 1 wherein the copolymer has a softening point in the range from 65 to 100° C.

16. A polyesteramide copolymer having a glass transition temperature (Tg) of less than or equal to 0° C., which comprises at least one hard amide segment wherein acid residues in said hard segment consist essentially of dimer fatty acid residues and not more than 20 wt % $C_6$ to $C_{20}$ dicarboxylic acid residues, and at least one soft ester segment which is derived from at least one dimer fatty diol and/or a polyester comprising at least one dimer fatty acid and/or dimer fatty diol and/or equivalent thereof.

17. A copolymer according to claim 16 wherein the copolymer has a softening point in the range from 60 to 125° C.

18. A copolymer according to claim 16 wherein the copolymer has a softening point in the range from 65 to 100° C.

19. An article comprising an aluminum substrate and having on at least one surface thereof an adhesive layer comprising a polyesteramide copolymer having a glass transition temperature (Tg) of less than or equal to 0° C.; which comprises at least one hard segment comprising at least one amide bond and wherein acid residues in said hard segment consist essentially of dimer fatty acid residues, and at least one soft segment comprising at least one ester bond which is derived from at least one dimer fatty diol and/or a polyester comprising at least one dimer fatty acid and/or dimer fatty diol and/or equivalent thereof.

20. An article according to claim 19 wherein said polyesteramide copolymer exhibits an adhesive fracture energy of at least 10 Joules/m$^2$.

21. An article according to claim 19 where said polyesteramide copolymer exhibits an adhesive fracture energy of at least 25 Joules/m$^2$.

\* \* \* \* \*